J. PARKER.
SUSPENSION BEARING.
APPLICATION FILED FEB. 27, 1920.
1,390,582.
Patented Sept. 13, 1921.
2 SHEETS—SHEET 1.
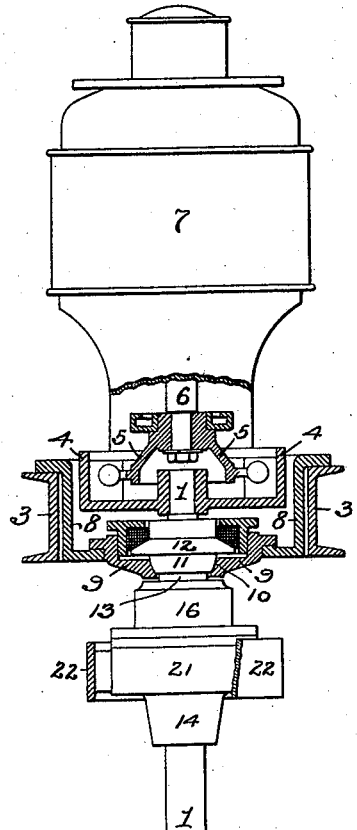
Fig. 1.
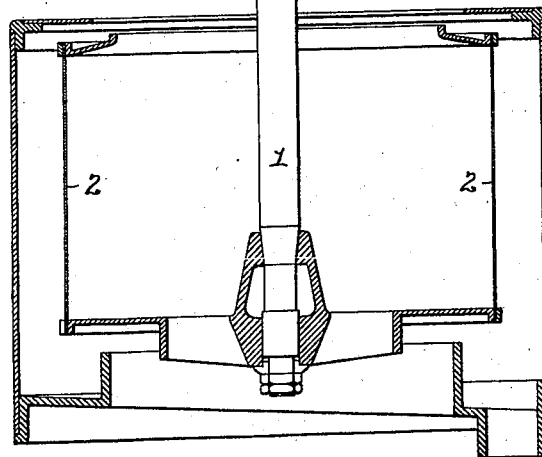
INVENTOR
JOHN PARKER
BY HIS ATTORNEY
Harry Smith

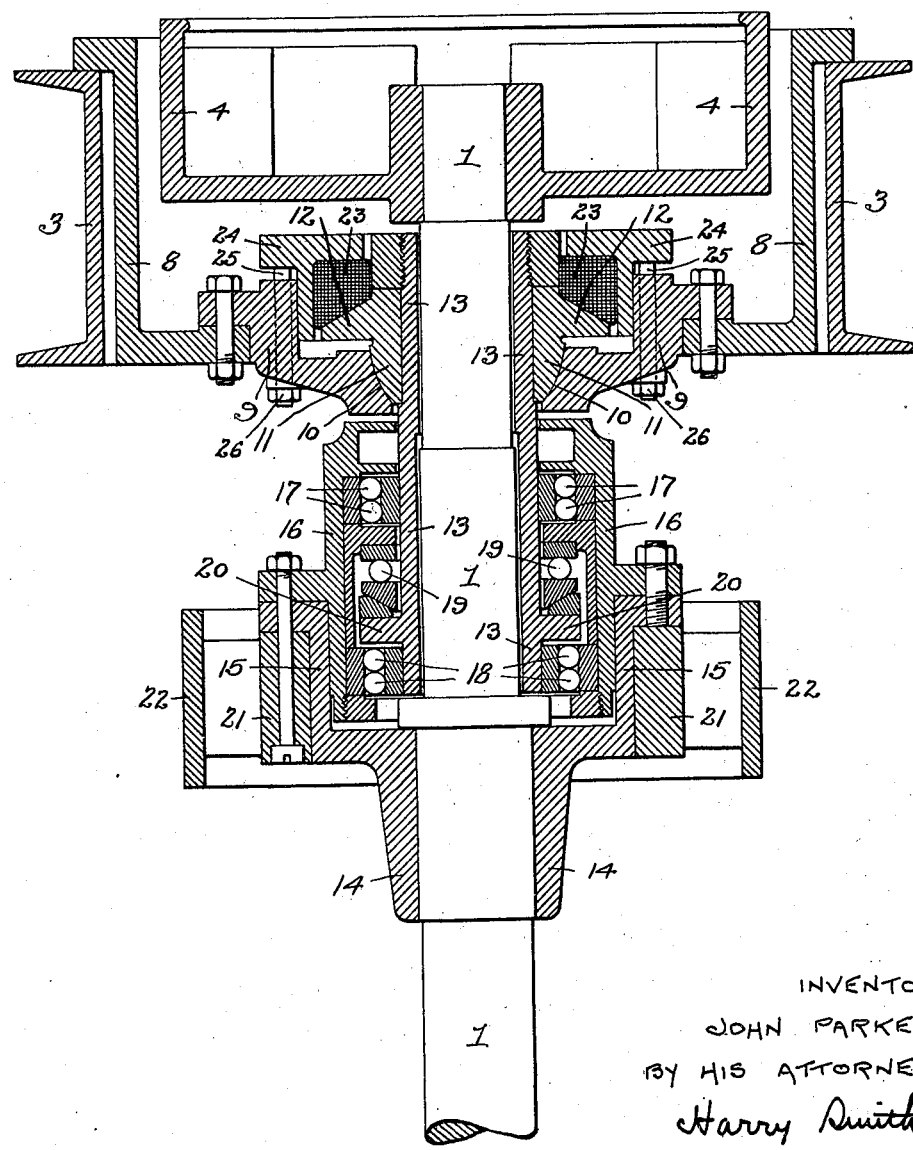

UNITED STATES PATENT OFFICE.

JOHN PARKER, OF PHILADELPHIA, PENNSYLVANIA.

SUSPENSION-BEARING.

1,390,582.  Specification of Letters Patent.  Patented Sept. 13, 1921.

Application filed February 27, 1920. Serial No. 361,890.

*To all whom it may concern:*

Be it known that I, JOHN PARKER, a citizen of the United States, residing in Philadelphia, Pennsylvania, have invented certain Improvements in Suspension-Bearings, of which the following is a specification.

My invention relates to that type of suspended centrifugal machines in which the driving shaft or spindle extends upwardly through its supporting bearing and is provided, thereabove, with a clutch through the medium of which it is driven by a suitably disposed motor or other power imparting device. The object of my invention is to provide an improved elastic supporting bearing for the driving shaft or spindle of such a centrifugal machine, and this object I accomplish in the manner hereinafter set forth, reference being had to the accompanying drawings, in which, Figure 1 is a view, partly in side elevation and partly in vertical section, of sufficient of a centrifugal machine, its supporting bearing and driving motor to properly illustrate my invention, and Fig. 2 is a similar view, on a larger scale, of the upper end of the driving shaft, or spindle, of the centrifugal machine shown in Fig. 1, but showing its supporting bearing in greater detail.

Referring in the first instance to Fig. 1, I show a driving shaft or spindle 1 (which, hereinafter, for convenience, I shall refer to simply as a "spindle") to the lower end of which is secured a drum or basket 2 adapted to receive the material to be treated. The upper portion of the spindle 1 passes through a supporting bearing mounted upon a frame 3 from which the machine is suspended, and its upper extremity is provided with a head 4 which forms one element of a releasable friction clutch, the other element 5 of which is secured to the lower end of the power shaft 6 of a motor 7 which furnishes the driving power for the machine.

The elastic supporting bearing through which the upper portion of the spindle 1 passes and by and upon which it is rotatably mounted and suspended forms the subject of this invention and is more particularly illustrated in Fig. 2 of the drawing. Mounted upon the frame 3 is a housing or hanger 8 to the central portion of which is secured a ring 9 in which is formed a spherical seat 10 adapted to receive a correspondingly spherical projection 11 on a hub or flange 12 secured to a centrally disposed annular sleeve 13, thus forming a ball and socket suspension for said annular sleeve. In order to maintain this sleeve in vertical position upon the seat 10 and resist oscillation of the same, the hub or flange 12 is provided with a suitable resilient backing. In the present instance I have illustrated this resilient backing as comprising a rubber ring 23 maintained against the back of the flange 12 by means of a gland 24 held in position by means of an annular series of bolts 25 which pass through the gland and the ring 9 and are engaged by nuts 26. These nuts are readily accessible and the degree of resiliency of the backing ring 23 may quickly be varied or controlled by tightening or loosening of the nuts. The upper portion of the spindle 1 passes through this sleeve 13 and is suspended therefrom and guided thereby and therein in the following manner:

To the spindle 1, immediately below the termination of the sleeve 13, is attached the hub 14 of a cup-shaped head 15 to which is secured a casing 16 inclosing bearings 17, 18 and 19. The bearings 17 and 18 are lateral bearings and the bearing 19 is a vertical bearing and is mounted upon a flange 20 projecting outwardly from the sleeve 13 adjacent its lower end. It will therefore be readily seen that the spindle 1 is supported and guided entirely by the annular sleeve 13 which, in turn, enjoys a ball-and-socket suspension from the fixed frame 3.

It is, of course, understood that the bearings 17, 18 and 19 operate in an oil bath contained within the casing 16.

By preference, the hub 21 of a brake pulley 22 is also secured to the head 15 but this feature of construction forms no part of my invention.

I claim:

The combination, in a suspension bearing, of a fixed frame, a hanger mounted thereon, a sleeve suspended in a spherical seat on said hanger, an external flange on said sleeve, a spindle passing loosely through said sleeve and being provided, at its upper end, with a driving element, a casing secured to said spindle and embracing said sleeve below its seat, radial bearings interposed between said casing and said sleeve, and suspension bearings interposed between said casing and the flange on said sleeve.

In testimony whereof, I have signed my name to this specification.

JOHN PARKER.